Nov. 8, 1938.   G. A. LYON   2,135,757
WHEEL DISK CONSTRUCTION
Filed Oct. 29, 1934   6 Sheets-Sheet 2

George Albert Lyon.

Nov. 8, 1938.　　　　G. A. LYON　　　　2,135,757
WHEEL DISK CONSTRUCTION
Filed Oct. 29, 1934　　　6 Sheets-Sheet 4

Nov. 8, 1938.   G. A. LYON   2,135,757
WHEEL DISK CONSTRUCTION
Filed Oct. 29, 1934   6 Sheets-Sheet 5

Patented Nov. 8, 1938

2,135,757

UNITED STATES PATENT OFFICE 2,135,757

WHEEL DISK CONSTRUCTION

George Albert Lyon, Detroit, Mich.

Application October 29, 1934, Serial No. 750,411

3 Claims. (Cl. 301—37)

This invention relates to improvements in wheel disk construction of a character highly desirable for use in connection with wheels for vehicles of the automotive type, although the invention will have other uses and purposes, as will be apparent to one skilled in the art.

In connection with wheels of the type commonly used in automotive vehicles, extremely little tolerance is allowed in variation of hub diameter, rim diameter and the centering of the hub with respect to the rim. However, considerable tolerance is permitted in the lateral or axial displacement of the wheel hub relatively to the tire rim. In some constructions, this lateral displacement, always in the permissible manufacturing range, amounts to as much as one-eighth of an inch. Consequently, difficulty has been experienced in providing cover plates or disks for disposition between the hub and rim of a wheel of this character. Especially is this true in connection with the use of cover plates or disks on wire spoked wheels. The variation is so great in the lateral displacement of the hub relatively to the rim as to not infrequently result in a misfit of the disk or cover plate sufficiently to set up very objectionable rattling or drumming action during usage.

Difficulty has also been experienced in providing a disk or cover plate construction capable of compensating for the flexing of the rim relatively to the hub of the wheel due to variation in holes disposed upon the wheel, and if such compensation is not had, drumming also may result. Further, in the present day manufacture of wire spoked wheels, the tendency is to have the outer spokes of the wheel immediately adjacent the edge of the hub flange leaving insufficient room for the attachment of a disk or cover plate to the hub externally of the spokes. Difficulty has been experienced in providing cover plates or disks for such wheels, in that drumming adjacent the hubs of the wheels would frequently result.

With the foregoing in mind, it is an object of this invention to provide a cover plate or disk for disposition between the hub and rim of a wheel, which cover plate may be pressed into position upon the wheel in secure and tight engagement with a portion or portions of the wheel, regardless of the variance in displacement of the hub relatively to the rim, without rattling or drumming action while in use.

It is also an object of this invention to provide a cover plate or disk of standard size and construction easily mountable upon any wheel of a designated size, and fit upon such wheel in a tight and secure manner regardless of the variance in displacement between the hub and rim of the wheel.

Also an object of this invention is the provision of a disk for disposition between the hub and rim of a wheel of the automotive type, which disk is capable of automatic self-adjustment to compensate for flexing of the rim relatively to the hub of the wheel.

Another object of this invention is the provision of a cover plate or disk for attachment to a vehicle wheel over the spokes thereof, the cover plate having a non-rattling, non-drumming engagement with the wheel and automatically compensating for flexing of the rim relatively to the hub.

Still another object of this invention is the provision of a cover plate or a disk for vehicle wheels of the character described herein, which cover plate carries means sufficiently resilient to permit pressing of the cover plate into engagement with a vehicle wheel but arranged for biting engagement with the hub of the wheel to resist any tendency to dislodge the cover plate.

It is a further object of this invention to provide a cover plate for disposition between the hub and rim of the wheel, which cover plate is arranged to be pressed into position upon the wheel and to provide a biting engagement with both the hub and rim of the wheel to resist any movement or pressure tending to dislodge the plate from the wheel.

Another object of the invention is the provision of a cover plate for overlying a portion of the spokes of a wheel, the cover plate being provided with securing means capable of engaging a portion of the wheel between adjacent spokes thereof.

Still another object of the invention is the provision of a cover plate for overlying at least a portion of the spokes of a wheel, the cover plate carrying means for secure engagement with the hub of the wheel, said means being spaced apart sufficiently to extend between adjacent spokes of the wheel.

Also an object of this invention is the provision of a cover plate for overlying the spokes of a wheel between the hub and rim of the wheel, the cover plate carrying securing means thereon for extending between the spokes of the wheel and engaging a portion of the wheel surface to the rear of the forward edges of the spokes.

It is also an object of this invention to provide a cover plate for overlying the spokes of a wheel, with securing means carried by the cover plate sufficiently to extend between the spokes of the wheel, the arrangement being such that the securing means are effectively concealed from an observer gazing at the outer face of the wheel.

Another feature of the invention resides in the provision of a cover plate for a vehicle wheel carrying spaced teeth for engagement with the hub of the wheel in a manner to resist removal of the plate after the same is once pressed upon the wheel, the construction being such as to effectively conceal the teeth.

Also a feature of the invention resides in the provision of a cover plate having teeth integrally formed in the central portion thereof for engagement over the hub of a wheel, the cover plate also carrying holding means on the external face thereof for supporting means to conceal the teeth.

Still another object of this invention is the provision of a cover plate for attachment to a vehicle wheel between the rim and hub thereof, the cover plate being readily pressable into position upon the wheel and embodying a plurality of spaced teeth sufficiently resilient to pass over a high point of the hub and drop behind the same to a lower point in biting engagement with the hub to resist any tendency to dislodge the cover plate from the wheel.

It is also an object of this invention to provide a cover plate or disk for a vehicle wheel wherein the cover plate is provided with teeth disposed at such an angle and arranged in such a manner as to provide biting engagement with the hub of the wheel so that any pressure tending to loosen the cover plate only augments the biting action of the teeth, such biting engagement being sufficient to hold the cover plate rigidly and solidly upon the wheel with the outer periphery of the cover plate in engagement with the rim of the wheel.

Still a further object of the present invention is the provision of a cover plate for disposition between the hub and rim of a vehicle wheel, the cover plate being provided with gripping means for engagement over the wheel hub and with means providing a resilient shock-absorbing or cushioning contact with the wheel rim to effectively eliminate any drumming of the disk.

Still a further object of the present invention is the provision of a disk or cover plate for a vehicle wheel mountable over the hub of the wheel, with means for effectively engaging the hub of the wheel tending to prevent dislodgement of the cover plate, and with means for engagement with the rim of the wheel, all of the means being effectively concealed from an observer gazing at the outside surface of the wheel, the engagement with the rim of the wheel being a biting engagement, a resting engagement or a cushioning engagement, as may be deemed most feasible.

In one form of the invention, a disk is provided having an outer face extending from the wheel rim to the wheel hub, and on the inner face of the disk a securing element is welded or otherwise secured, the securing element including a plurality of spaced teeth disposed at an angle to the hub of the wheel for biting engagement with the hub tending to resist dislodgement of the disk, such engagement being sufficient to hold the disk rigidly and firmly upon the wheel. In this form of construction, the teeth for engagement over the wheel hub are effectively concealed by the outer portion of the disk so as to be invisible to an observer gazing at the outside of the wheel. It will also be noted that in this construction the entire disk or cover plate may be pressed into position upon the wheel and the teeth are disposed at such an angle that any tendency towards jarring or movement of the disk only augments the biting action, securing the disk more firmly in position. While the disk is firmly and rigidly held in position against drumming or rattling, the disk is still so constructed and so mounted as to automatically adjust itself to compensate for any flexing of the rim relatively to the wheel hub. With this construction, it is obvious that material variation may be present in lateral displacement of the hub relatively to the wheel rim without in any manner affecting the proper positioning of the disk.

In another form of the present invention, the wheel disk is formed in the inner portion thereof to provide teeth extending diagonally rearwardly of the point of contact with the wheel hub, there being notches cut in the inner face of the disk to provide spaces between the teeth so that they may seat between alternate spokes of the wheel. The outer face of the disk is also provided preferably with holding means over which an annular bead or decorative band may be disposed to conceal the securing teeth. This band may be held in position by means struck from the disk itself, or the disk may be apertured and the holding means made a part of the band. Such construction provides all the features of the construction just above mentioned and may be mounted in substantially the same manner, the decorative band being attached either before or after the positioning of the disk upon the wheel, as may be deemed most desirable.

In either of the above mentioned forms of the present invention, a plurality of various means may be associated with the disk for engagement with a surface of the tire rim of the wheel, and either form of disk may have any of the various rim-engaging constructions mentioned hereinafter. If so desired, decorative bands may also be associated with the rim constructions, and these rim constructions may be made for resting engagement, biting engagement or cushioning engagement with the rim, as may be deemed most desirable.

Hereinafter, a relatively large number of rim engaging constructions are illustrated, and such illustrations are deemed essential herein to best point out the considerable range of applicability of the various forms of hub engaging means to the great many conditions, variations in displacement between relative parts, various sizes, and different features of construction contingent with the manufacture of vehicle wheels.

While some of the more salient features, characteristics and advantages of the present invention have been above pointed out, others will become apparent from the following disclosures.

The invention includes these and other features of construction and combinations of parts hereinafter described, and shown in several forms in the drawings, as more particularly indicated by the claims.

Figure 1:
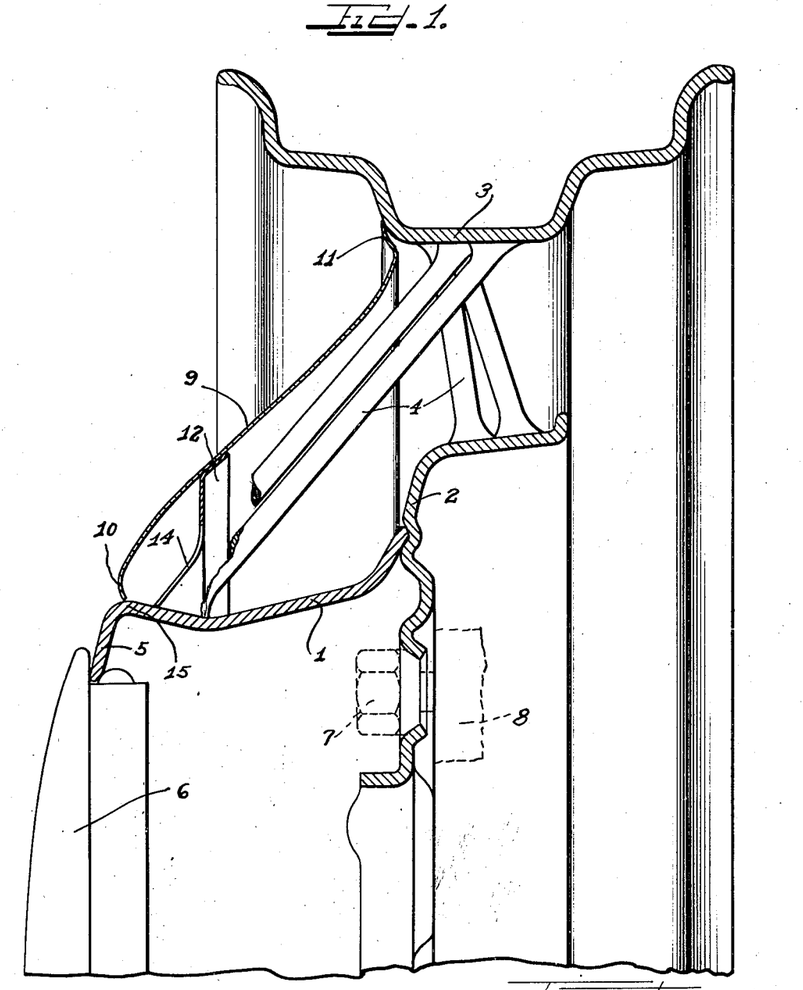
Figure 1 is a fragmentary vertical sectional view, with parts in elevation, taken substantially centrally through a wire spoked automobile wheel equipped with a cover plate construction embodying principles of the present invention.
Figures 4, 5:
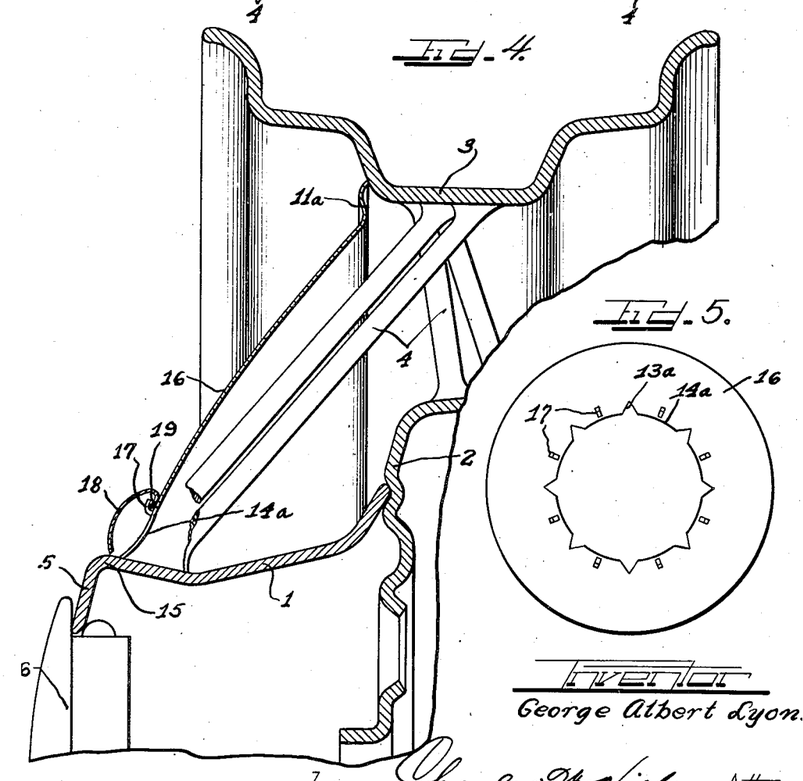
Figure 4 is a fragmentary vertical sectional view, with parts in elevation, showing a wheel equipped with a cover plate construction embodying the principles of the present invention but having a slightly different form of central attachment means.
Figure 5 is a reduced elevation view of the blank from which the main part of the cover plate construction shown in Figure 4 is formed.

At the outset, it should be understood that while many various forms of rim engaging construction have been shown herein, and various forms of construction for association with a tire valve have also been shown, any of these constructions may be utilized with either of the central securing arrangements shown in Figures 1 and 4, or with some variation of these central securing constructions within the purview of this invention. It should also be noted that any of the various forms of rim engaging construction may be adapted in similar manner to that shown in Figures 18, 20 and 25 for association with the tire valve stem.

Figure 2:
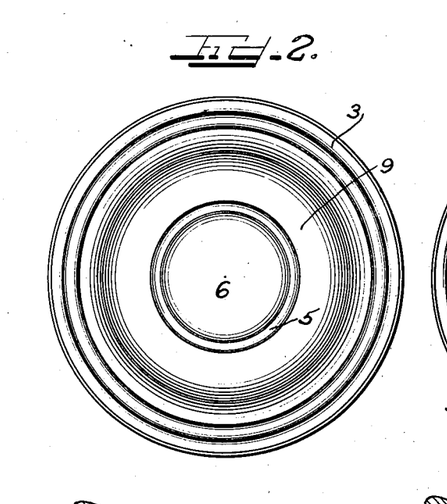
Figure 2 is a reduced outisde elevational view of the structure shown in Figure 1.
Figures 3, 10:
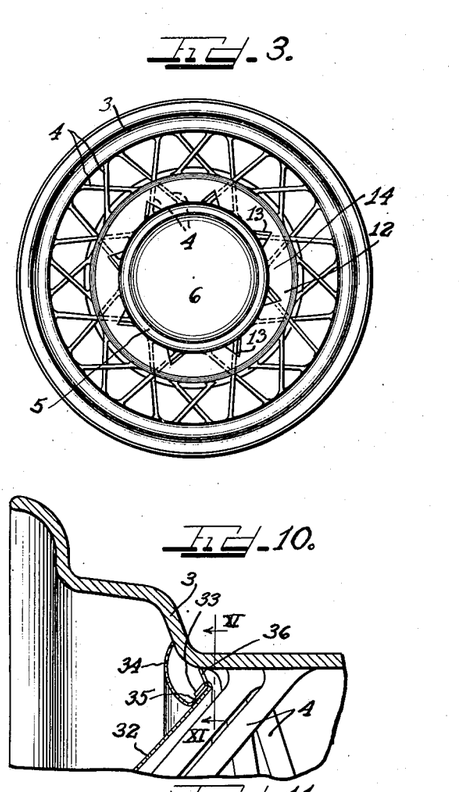
Figure 3 is a view similar to Figure 2 with the forward portion of the cover plate construction shown removed to better illustrate the central securing means.
Figure 10 is a fragmentary vertical sectional view of a wheel with cover plate attached, showing a slightly different form of construction including a decorative bead or band to conceal the engagement of the cover plate with the rim.

In the illustrated embodiment of the present invention as seen in Figures 1, 2 and 3, the invention is shown as associated with an automobile wheel of a common or standard construction. In this instance, the wheel includes a hollow hub 1 connected with a mounting flange member 2, and a drop center tire rim 3 connected with both the hollow hub and the mounting flange by means of a plurality of wire spokes 4. The hollow hub 1 is provided with an inwardly turned hub flange 5, and the opening through the hub flange is closed by the conventional hub cap 6. It will also be seen that in this particular wheel the forward spokes 4 terminate substantially at the outer edge of the hollow hub, leaving no room for proper engagement on the hub outside the spokes by attaching means for a cover plate construction. As indicated diagrammatically in dotted lines, the entire wheel may be mounted by means of bolts 7 extending through suitable apertures in the mounting flange to any desirable form of supporting element 8 which may be a spare wheel rack or the spindle flange of an axle.

Associated with the wheel above described is a cover plate or disk 9 embodying features of the present invention. The disk in this instance is shown as covering substantially all of the space between the wheel hub and the tire rim, completely concealing the spokes 4, and giving the external appearance of a disk wheel. However, it will be understood that if so desired, the cover plate 9 need not extend all of the way to the rim of the wheel but may extend outwardly towards this rim to any desirable extent, the central securing means for engagement with the wheel hub later described herein being amply sufficient to hold the cover plate in proper position upon the wheel regardless of whether or not a portion of the cover plate is in contact with the wheel rim or some similar solid structural part of the wheel.

In this instance, the cover plate 9 is in the form of a dished shell, the walls of which slope inwardly, the plate or disk having a central aperture therein for receiving the hub 1. Adjacent the central aperture the plate is provided with an inwardly turned ridge 10 to enhance the resultant appearance of the composite structure, and adjacent the outer periphery thereof the plate is provided with a substantially S-curved lip 11 for resting contact with the tire rim 3. The disk 9 is preferably formed of relatively thin sheet metal and may be readily shaped by stamping operations.

To maintain the disk in proper position upon the wheel, an annular attaching element 12 is secured to the inside face of the disk, as by welding, brazing or any other suitable manner, adjacent the lower portion of the disk. In the inner portion thereof, the annular element 12 is provided with a plurality of spaced notches 13 (Figures 1 and 3) of substantially triangular formation, defining between each pair of adjacent notches a relatively wide tooth 14. As best seen in Figure 1, the teeth 14 are bent outwardly so that when the cover plate construction is in place upon the wheel these teeth extend diagonally rearwardly, sloping rearwardly and toward the wheel rim away from the hollow hub 1. The preferable construction is to have as many teeth as there are outer spokes upon the wheel. In this instance, the wheel illustrated contains the customary 32 wire spokes, sixteen engaged with the hollow hub 1 and sixteen engaged with the mounting flange 2. Of the outer sixteen spokes, eight of these spokes project outwardly towards the hub flange beyond the other eight spokes. Consequently, in this instance, it is preferable to provide the element 12 with eight teeth. These teeth are so spaced as to fit between the outer eight spokes, as seen in Figure 3, the notches 13 providing suitable openings for the inner ends of the spokes to project through.

Adjacent the outer end thereof, the hub 1 has a relatively high annular portion 15, and the teeth 14 are sufficiently resilient to permit them to be pressed inwardly over this high point on the hub until the teeth drop behind the high point and engage the hub and the tapering surface therebehind. This flexing of the teeth does not distort them permanently in any manner, the teeth assuming their original formation immediately after passing the high point on the hub.

In mounting the cover plate construction upon a vehicle wheel, it is simply necessary to take the wheel cover plate construction and press it upon the wheel over the hollow hub, pushing the cover plate inwardly a sufficient distance for the lip 11 to contact with a surface upon the tire rim 3. The plate is rigidly held in position solely by the teeth 14 against rattling or drumming during usage of the vehicle. It is at once apparent that the teeth 14, due to their particular backward slant, provide a biting engagement with the outer surface of the hollow hub so that it is virtually impossible to remove the cover plate construction without injury to some portion of the apparatus. While the cover plate construction is held sufficiently rigid to eliminate rattling or drumming, it nevertheless is still sufficiently flexible and the engagement of the lip 11 with the rim 3 is such as to permit an automatic self-adjustment of the cover plate construction to compensate for flexing of the rim relatively to the hub during the imposition of various loads upon the wheel.

It will also be readily apparent that any force, pressure or tendency to dislodge or remove the cover plate construction from its engagement with the wheel only augments the biting action of the teeth and thus insures a more firm securement of the cover plate construction. The cover plate or disk may be made in a standard size for wheels of a certain diameter, and regardless of the variance in lateral displacement of the hub relatively to the rim, any of the plates so made will fit any wheel of the diameter for which the plate was designed. The plate may be pressed inwardly over the wheel hub until it is seated in the proper position upon the wheel and it makes not the slightest difference that it may have to be pressed inwardly farther in some instances than in other instances due to the variation in lateral displacement between the hub and rim.

Hereinafter, in all of the various forms of the present invention disclosed and described, the same identical type of wheel construction is associated with the covering means, and therefore, specific descriptions of the wheel constructions will not be given any further herein.

In the construction shown in Figures 4 and 5, an annular cover plate 16 is shown provided at its outer periphery with a substantially S-curved lip 11a of the same character as the lip 11 aforementioned. In this instance, however, the inner portion of the plate or disk 16 is provided with spaced notches 13a of substantially triangular shape defining, between adjacent pairs thereof, teeth 14a sloping forwardly in the same manner as the teeth 14. In view of the fact that the notches 13a are cut directly into the plate 16 itself and not in a piece mounted on the back of the plate 16, it is desirable to cover up the notches and teeth so as to leave a pleasing external appearance of the entire wheel assembly. To this end, upwardly and outwardly curved lugs 17 are struck from the plate 16 at various points between the notches 13a. A transversely arcuate annular band or bead 18, provided with an inwardly turned marginal portion 19, is engaged with the lugs 17. This decorative bead or band may be in the form of an endless member rolled into engagement with the disk 16 prior to the application of the disk to the wheel, or it may be a resilient member with overlapped ends initially expanded over the lugs 17 and permitted to contract with the margin 19 behind the lugs. In either instance, the decorative bead may be applied to the disk 16 before the disk is applied to the wheel. In the latter instance; namely, if the bead is of the self-contractible type, it may also be applied after the disk has been attached to the wheel, if so desired.

It will be noted that no special form of decorative bead is essential, but various forms may be utilized and connected to the disk in various ways. For example, the forms of decorative beads set forth, described and claimed in my copending application entitled "Ornamental rings for disk wheels", Serial No. 744,758, filed September 20, 1934, might also be utilized in this connection.

The structure shown in Figures 4 and 5 is applied to the wheel in substantially the same manner as the structure shown in Figures 1 to 3, inclusive, and all of the advantages present in the first described construction are also in hand in the second described construction.

Figure 6:
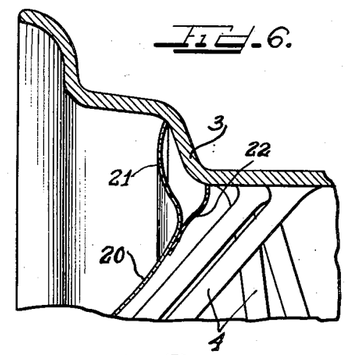
Figure 6 is a fragmentary vertical sectional view of a wheel and cover plate construction, illustrating a different form of rim engaging means on the cover plate.

In Figure 6, I have shown a different form of rim engaging construction associated with a cover plate 20 which may be either the cover plate 9 or the cover plate 16, or any similar cover plate having a central engaging portion for association with the hub of a wheel within the purview of this invention. In this instance, the cover plate is provided with an outwardly arced peripheral portion 21, the periphery of which engages a rim surface farther outwardly than is the case with the plates 9 or 16. Upon the rear face of the plate 20 a transversely arcuate member 22 is secured in any desired manner, such as by welding, brazing or the equivalent. This member 22 is preferably continuously annular but may, if so desired, be an annular row of spaced teeth. The arcuate portion of the element 22 is sufficiently flexible and resilient to permit the element to be pressed into engagement beneath the lowermost surface of the rim 3. The element is further so arced as to provide biting engagement with the undersurface of the rim, which engagement is augmented by any force or pressure tending to remove the cover plate construction from the wheel. In this instance, it will therefore be noted that biting engagement is provided not only on the hub of the wheel but also on the undersurface of the wheel rim in addition. The flexibility of the part 22 and also the flexibility of the arcuate portion 21 of the plate 20 is amply sufficient to provide automatic compensation for flexing of the rim relatively to the hub of the wheel due to variations in loads. The cover plate construction shown in Figure 6 is applied to the wheel in the same manner as the constructions shown in Figures 1 to 5, inclusive, and performs substantially the same results.

Obviously, any of the constructions shown and described herein are applicable to a wheel regardless of the variance in lateral displacement between the hub and rim, and also are in each instance capable of automatically compensating for flexing of the rim relatively to the hub. Furthermore, in each instance the cover plate constructions are readily applied to the wheel by a simple pressing action and are virtually impossible of removal from the wheel without injury to some part. The only desirable way of removing the cover plate from the wheel is to provide a suitable tool capable of extending through the wheel spokes, engaging and elevating the teeth immediately adjacent the hub of the wheel.

Various types of construction for engagement with the wheel rim will be hereinafter described to show the wide applicaiblity of the present invention. In each instance, the construction may be associated or incorporated with a cover plate of the character of the plate 9 or of the character of the plate 16, with either form of central engaging means, or some other form of engaging means within the purview of the invention.

Figure 7:
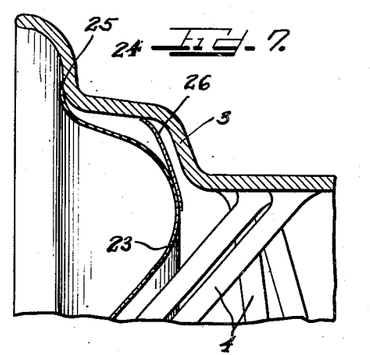
Figure 7 is a fragmentary vertical sectional view of a wheel with cover plate attached, illustrating another form of rim engaging means on the cover plate.

In Figure 7, I have shown a cover plate or disk 23 having a relatively widely outwardly flared portion 24 terminating in a peripheral lip 25 for resting engagement with an outer substantially vertical rim surface. On the inner side of this member an annular element 26 is welded or otherwise secured, and this element 26 may be either continuously annular or provided with spaced teeth. The element 26 is of sufficient flexibility to permit the same to be pressed beneath a substantially horizontal rim surface and the element flexed outwardly so as to provide biting engagement with the said rim surface upon any tendency to remove the cover plate construction from the wheel.

Figure 8:
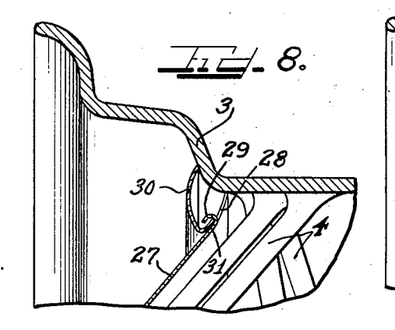
Figure 8 is a fragmentary vertical sectional view of a wheel with cover plate attached, illustrating another form of rim engaging construction associated with the cover plate, and illustrating the use of an annular bead or decorative band to conceal the engagement of the plate with the rim.
Figure 9:
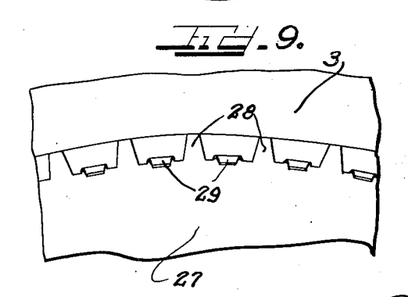
Figure 9 is a fragmentary elevational view of the structure shown in Figure 8 with the bead or decorative band removed.

In Figures 8 and 9 there is seen a cover plate 27 having spaced notches in the outer periphery thereof to provide relatively narrow spaced teeth 28 for engagement beneath a substantially horizontal surface of the rim 3. These teeth are, of course, sufficiently flexible to permit them to be pressed into engagement with the surface of the rim, and the teeth are so arced as to provide biting engagement with the rim surface. Between the teeth 28, forwardly and inwardly turned lugs 29 are provided extending outwardly from the external surface of the plate 27. An annular decorative band or bead 30, having an underturned portion 31 for engagement beneath the lugs 29 is provided to cover or conceal the spaced teeth 28 and present a pleasing external appearance of the whole of the entire wheel structure. This bead may be either continuous and applied prior to the attachment of the cover plate construction to the wheel, or it may be of the self-expansible split ring type and applied either before or after the engagement of the cover plate on the wheel.

Figure 11:
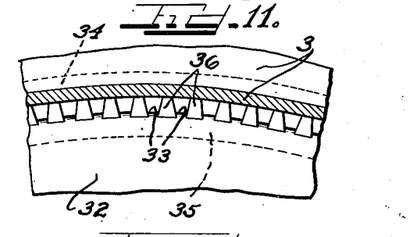
Figure 11 is a fragmentary vertical sectional view, with parts removed, taken substantially as indicated by the line XI—XI of Figure 10.

In Figures 10 and 11, there is shown a cover plate 32 which does not extend to the rim of the wheel, but instead terminates in a plurality of reversely bent teeth or lugs 33 extending over the outer face of the plate. To establish contact with the rim 3, an annular, preferably endless, bead or decorative band 34 is provided. This band has an underturn 35 terminating in a plurality of spaced teeth 36 inclined outwardly for biting engagement against a substantially horizontal rim surface. The teeth 36 project through the spaces between the lugs 33 and alternate with these lugs. The forward portion or outermost peripheral edge of the bead 34 contacts with a rim surface outwardly beyond the teeth 36 to present a pleasing external appearance of the wheel assembly. Of course, this cover plate construction is preferably entirely formed prior to the application of the same to the wheel. The structure may be applied to the wheel by simply pressing the same into position upon the wheel, and possesses all of the advantages of the structure hereinabove described.

Figures 12, 13:
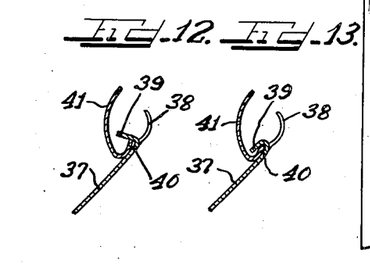
Figure 12 is a fragmentary vertical sectional view through a portion of a slightly different type of cover construction including a decorative band, showing an initial step in the formation of the construction.
Figure 13 is a view similar to Figure 12 showing a further step in the formation of the construction.
Figure 14:
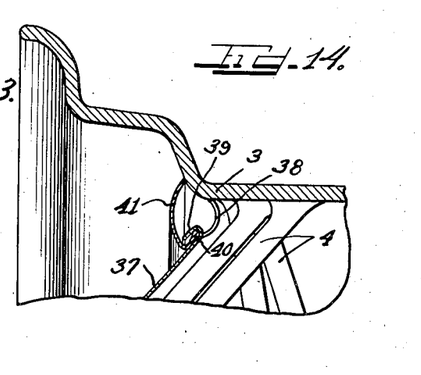
Figure 14 is a fragmentary vertical sectional view illustrating a wheel with the construction of Figures 12 and 13 thereto applied.

In Figures 12, 13 and 14, a different form of interlocked connection between the cover plate and decorative bead is disclosed. In this instance, a cover plate 37 is provided with a plurality of spaced arcuate teeth 38 for biting engagement with the innermost horizontal rim surface when pressed into contact therewith. Alternating with the teeth 38 are a plurality of reversely bent lugs 39 engaged over an underturned flange 40 of a decorative bead or band 41. The outer peripheral edge of the bead 41 is in resting engagement with an obliquely extending rim surface diametrically beyond the teeth 38 so as to provide a pleasing external appearance to the wheel assembly.

In Figures 12 and 13, I have illustrated how the lugs 39 are bent over the underturned margin 40 of the teeth 41 prior to the application of the cover plate construction to the vehicle wheel. Initially the lugs 39 are not reversely bent but are disposed at any suitable angle to the body of the plate 37. A gradual bending of the lugs over the underturned flange of the decorative bead is readily accomplished with suitable instrumentalities for such a purpose.

Figure 15:
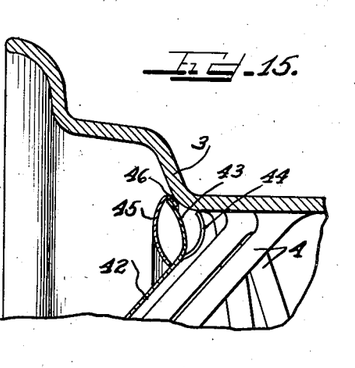
Figure 15 is a fragmentary vertical sectional view of a wheel with a somewhat different form of cover construction thereto applied, illustrating another use of a decorative band to conceal the engagement of the cover plate with the rim of the wheel.

In Figure 15, I have shown a cover plate 42 which was initially provided with a plurality of radial splits adjacent the outer periphery thereof to provide a toothed periphery for the disk. Alternate teeth 43 are bent forwardly for the purpose of supporting a decorative band. The other alternate teeth 44 are arcuate to a greater extent than the teeth 43 and are bent rearwardly for biting engagement beneath the innermost horizontal surface of the rim. A decorative bead 45, substantially identical with the bead 41 above mentioned, is provided in reverse position, with the underturned portion 46 thereof engaged behind the outer extremities of the teeth 43. When the cover construction is pressed into position on the vehicle wheel contact with the rim is made first by the teeth 44 in a biting engagement and also by the underturned portion 46 of the decorative bead in resting engagement.

Figure 16:
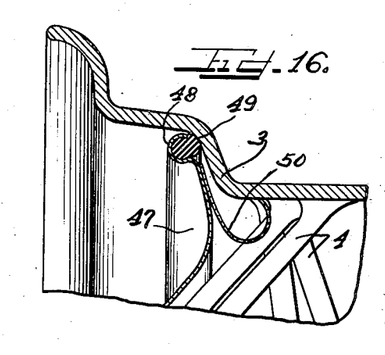
Figure 16 is also a fragmentary vertical sectional view of a wheel and cover plate, illustrating a construction including a cushioning element associated with the cover plate for engagement with a tire rim.

In Figure 16 I have shown a cover plate construction including resilient or cushioning means for engagement with a rim surface. In this instance, a cover plate 47 is utilized having a formation 48 to provide a peripheral groove therein. Seated in this groove is an annular cushioning element 49, preferably of soft rubber, and this element may either be completely annular or comprise spaced annular portions, as may be deemed most desirable. It will be noted that after the cushioning element 49 has been placed in the groove and the cover plate construction pressed into position upon the wheel, the general or cross-sectional shape of the cushioning element is distorted, thus insuring positive contact with a rim surface to eliminate rattling or drumming.

Secured to the rear face of the cover plate 47, as by welding, brazing or in some similar manner, is a relatively widely reversely bent supporting element 50 which has the inner portion thereof curved so that the peripheral edge portion may contact the undersurface of a substantially horizontal part of the rim at such an angle as to provide biting engagement upon any tendency to remove the cover plate construction from the wheel. This holding means 50 may either be an annular member provided with spaced teeth, each of which extends between a pair of adjacent spokes of the wheel, or the element may be a plurality of individually separate pieces of a size to extend between spokes, as many pieces being utilized as is found most feasible.

Figure 17:
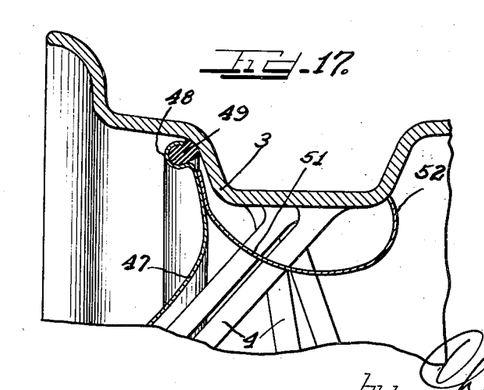
Figure 17 is a fragmentary vertical sectional view of a wheel equipped with a cover plate, showing a different form of cushioning engagement between the cover plate and wheel rim.

In Figure 17, there is shown the same cover plate construction 47 including the peripherally grooved formation 48 together with the cushioning element 49. However, in this instance, a plurality of spaced holding members 51 are secured to the rear portion of the cover plate, as by brazing, welding or in some similar manner. Each of the members 51 extends rearwardly between the spokes of the wheel and terminate in a diametrically outwardly turned end portion 52 for biting engagement with an opposite surface of the rim from that contacted by the cushioning element 49. The elements 52 are, of course, sufficiently flexible or resilient to permit the construction to be pressed into engagement upon the wheel, the portions 52 flexing sufficiently to slide under the lower substantially horizontal portion of the rim, and then expand diametrically on the opposite side of this portion by their own resiliency.

Figure 18:
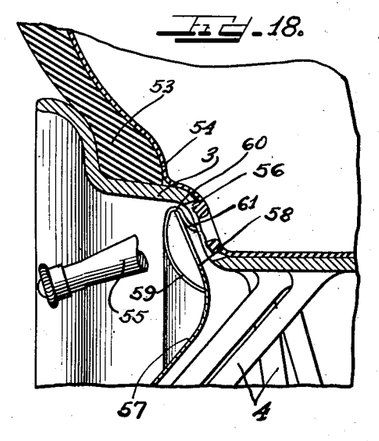
Figure 18 is a fragmentary vertical sectional view of a wheel and cover plate, including an inner tube and tire, illustrating one manner in which the present invention may be adapted to accommodate the tire valve.

In Figure 18, I have shown one adaptation of means embodying the present invention for accommodation of the customary valve stem extending from the inner tube of an automobile tire. In this instance, the rim 3 is provided with a suitable pneumatic tire casing 53 containing the customary inner tube 54, from which tube a suitable valve stem 55 extends through an aperture 56 in the rim 3. In this instance, a cover plate 57 is provided which has an outwardly slanting peripheral portion preferably not in engagement with the tire rim 3. The peripheral portion of the cover plate is notched, as seen at 58 in Figures 18 and 19, for the accommodation of the valve stem 55, this valve stem being indicated in dotted lines in Figure 19 for the purpose of clarity. Around the peripheral portion of the cover plate is a decorative bead 59 having an underturned portion 60 engaged around the peripheral edge of the cover plate, and which portion 60 is bent inwardly towards the tire rim, as indicated at 61 in Figure 18, to provide a somewhat resilient engagement of the cover plate construction with the tire rim.

Figure 19:
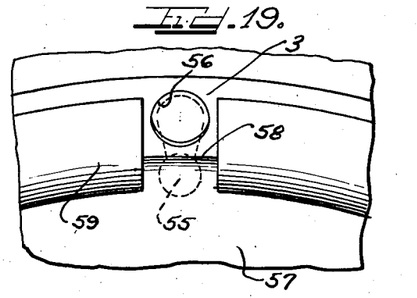
Figure 19 is a fragmentary side elevational view of the structure shown in Figure 18.

As seen more clearly in Figure 19, the bead 59 is not endless in character but terminates just short of the valve stem 55 on each side thereof, this gap in the beading not being readily discernable because the gap is substantially filled by the valve stem. Of course, the structures shown in Figures 18 and 19, as well as the construction to be later described herein in connection with Figures 20 and 25, may be used with certain of the other variations in construction herein set forth, and it is deemed that these figures are sufficient to indicate desirable methods of accommodating a valve stem with any of the constructions described herein.

Figure 20:
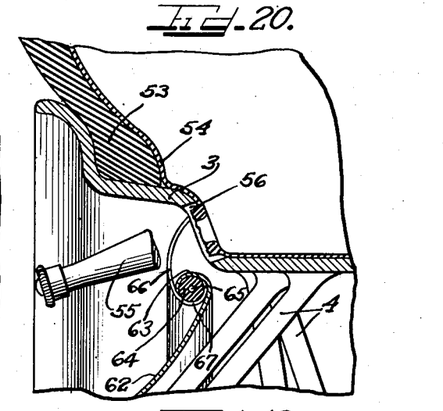
Figure 20 is a fragmentary vertical sectional view of a wheel with a cover plate attached thereto, illustrating a slightly different form of construction and showing its use in connection with a tire valve.

In Figure 20, there is seen a cover plate 62 having an outwardly rolled peripheral portion 63 thereupon which is not in engagement with the tire rim, and which is preferably disposed inside the valve stem 55. Snapped or otherwise seated within the groove formed by the formation 63 is a cushioning member 64 in the form of an annular element preferably of rubber, this member containing an annular spring wire 65 which tends to expand outwardly and insures the proper seating of the element within the curl 63. A decorative bead 66 is associated with the peripheral portion of the cover plate, and this bead 66 is also provided with an inner curled portion 67 disposed in interlocking engagement with the curl 63 of the plate and engaging the cushioning element 64. The outermost edge of the bead is turned inwardly for contact with the surface of the tire rim. This bead 66 is preferably of the split ring type and terminates closely adjacent the valve stem 55 on each side thereof. The bead by its inherent resiliency tends to expand outwardly and so may be initially compressed, placed in position and when the pressure is released, the bead will assume a firm and positive engagement with the cover plate and the cushioning member. The cushioning member obviously eliminates any rattling or drumming action between the bead and cover plate itself.

Figure 21:
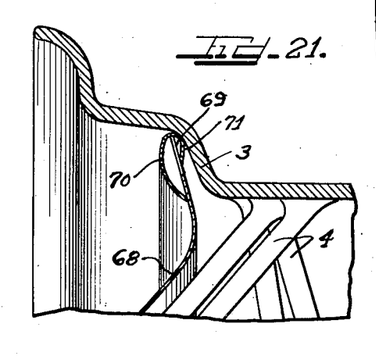
Figure 21 is a fragmentary vertical sectional view of a wheel with a cover plate in operative position thereon, illustrating another form of rim contacting structure.

In Figure 21 the wheel is shown equipped with a cover plate constrduction embodying a plate 68 having an outwardly inclined peripheral portion terminating in a plurality of spaced teeth 69, the spacing between these teeth being any desirable amount. These teeth are flexible so that they will give somewhat under compression. Disposed over the teeth 69 is a decorative bead 70 comprising a transversely arcuate body portion and an underturned margin 71 inclined for edge contact with the rear faces of the teeth 69. The curved part of the bead between the body portion and the underturned portion contacts with the surface of the rim and the compressibility of the teeth 69 aid in providing a firm contact with the rim at this point. The bead 70 may be endless or of an open ended spring ring character and is preferably applied to the plate 68 before the cover construction is attached to the wheel.

Figure 22:
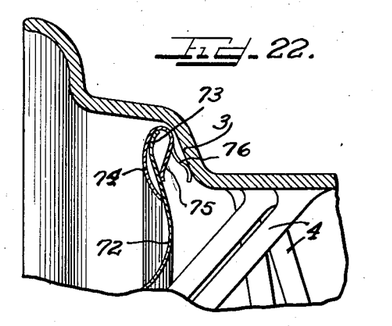
Figure 22 is a fragmentary vertical sectional view of a wheel with a cover plate mounted thereon, illustrating a resilient or cushioning contact with the wheel rim without the use of rubber or similar substance.

Figure 22 shows the wheel equipped with a cover plate construction including a plate or disk 72 having a peripheral inwardly turned marginal portion or lip 73 out of contact with the wheel rim. Around the peripheral portion of the plate is a decorative bead 74 having a rearwardly underturned portion containing a plurality of splits to form resilient teeth. These teeth are bent alternately outward for contact with the inner side of the plate and indicated at 75, and the other alternate teeth 76 are bent inwardly for contact with the surface of the rim. The bead preferably does not contact with the rim except by means of the resilient or cushioning engagement therewith afforded by the teeth 76. It will be noted that in this instance a resilient or cushioning engagement with the tire rim is provided without the use of any elastic material.

Figure 23:
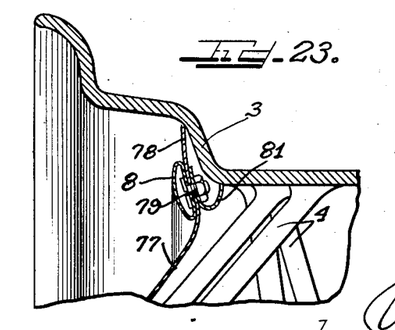
Figure 23 is a fragmentary vertical sectional view of a wheel and cover plate illustrating a bolted connection for rim engaging means and means for concealing such connection.

In the construction shown in Figure 23, the wheel is provided with a cover plate 77 terminating in a peripheral portion 78 slightly arched inwardly for contact with a rim surface. The portion 78 is provided with a plurality of apertures for a plurality of bolts 79 each of which has a relatively wide head and a relatively wide nut. Upon the outer face of the plate 77, in position to conceal the bolt head, is a decorative bead 80 having reversely bent underturned flanges leaving a channel for the shank to the bolt. The bolt head engages the flanges to hold the bead in position. On the opposite side of the cover plate 77 are a plurality of substantially U-shaped teeth 81, or, if so desired, a continuous U-shaped band may be utilized instead of teeth, the curvature being such as to provide biting engagement with the substantially horizontal portion of the rim. The engaging means 81 are held in position by means of the nut on the bolt 79 and are suitably apertured for positioning over the bolt shank. The bead 80 and holding means 81 are preferably bolted to the cover plate before the covering construction is attached to the wheel.

Figure 24:
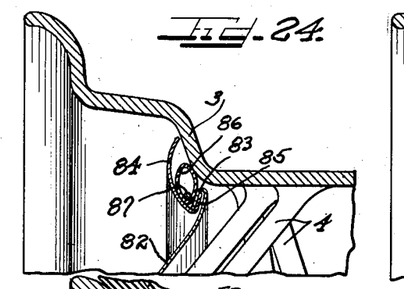
Figure 24 is a fragmentary vertical sectional view of a wheel with a cover plate thereto attached, illustrating a novel form of cushioning construction for disposition between the cover plate and the rim, the cushioning engagement being effected by a tubular resilient member.

Figure 24 discloses a different form of resilient cushioning means for contact with the tire rim. In this instance, a cover plate 82 is provided having a reversely bent peripheral flange 83 extending over the front face of the cover plate. A decorative bead 84 also having an underturned flange 85 is maintained in position on the plate by means of the engagement of the flanges 83 and 85. This bead may be either endless or of the spring ring type as desired. The bead is further transversely arcuate so that between the body portion of the bead and the flange 83 on the plate a groove like construction is provided. Seated in this groove construction is a tubular element 86 preferably made of soft rubber. The tubular element 86 contains therein a spring wire 87 which is initially stretched sufficiently to be snapped over the curved portions of the plate adjacent the flange 83, and the wire then contracts against the inner periphery of the tube holding the tube downwardly tightly disposed in the groove formation. When the structure is applied to the wheel, the rubber tube will be distorted slightly as seen in Figure 24 and afford a cushioning contact with the tire rim.

Figures 25, 27:
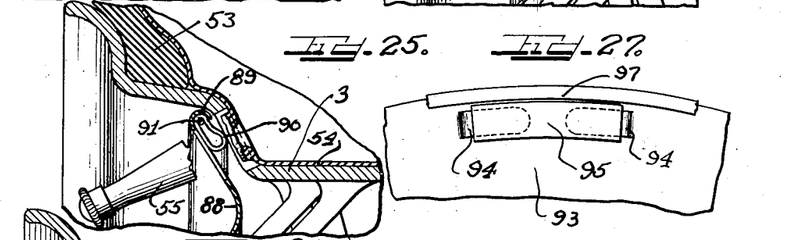
Figure 25 is a fragmentary vertical sectional view of a wheel with a cover plate thereto attached, illustrating a resilient tubular cushioning member and its immediate association with a tire valve.
Figure 27 is a fragmentary side elevational view of the cover construction shown in Figure 26 taken from the inside thereof.

In Figure 25, I have shown another form of plate construction including a tubular cushioning element. In this instance, a cover plate 88 is provided having an upper margin inwardly turned as at 89 to provide a peripheral groove in the plate construction. In this instance, no decorative bead is used. The portion 89 preferably does not contact with the tire rim. Seated within the groove construction is a tubular element 90 preferably of soft rubber, and this element contains a spring wire 91. In this instance, the spring wire is initially contracted to pass over the peripheral edge of the flange 89 and then the wire by its inherent resiliency expands outwardly forcing the tube into the groove construction. When the structure is applied to a wheel, the tube is distorted somewhat as illustrated to afford cushioning contact with the rim surface. Preferably, the only contact with the rim surface is by way of the tube. It will be noted that the tube 90 terminates on each side of the valve stem 55, but the wire 91 is preferably endless in character and continues over the valve stem outside thereof to insure the elimination of rattling or drumming action.

Figure 26:
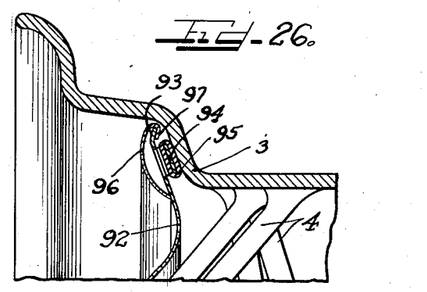
Figure 26 is also a fragmentary vertical sectional view of a wheel with a cover plate thereto attached, illustrating a different form of cushioning means associated with the cover plate for engaging the rim of the wheel.

A different form of cushioning means is disclosed in Figures 26 and 27, wherein there is seen a cover plate 92 terminating in an outwardly inclined peripheral portion 93 from which spaced confronting lugs 94 are struck. These lugs extend in spaced relationship to the plate on the rear side thereof. Over these lugs, as best seen in Figure 27, a short rubber tube 95 is positioned. This tube provides a bearing surface for contact with the surface of the tire rim. A decorative bead 96 of similar construction to the beads previously mentioned herein and having an underturned flange 97 is engaged over the peripheral edge of the plate 92, but this bead preferably does not contact with the tire rim. As many pairs of lugs 94 provided with sections of tubing 95 may be provided around the under surface of the plate 92 as may be deemed best desirable for the purposes intended.

Figure 28:
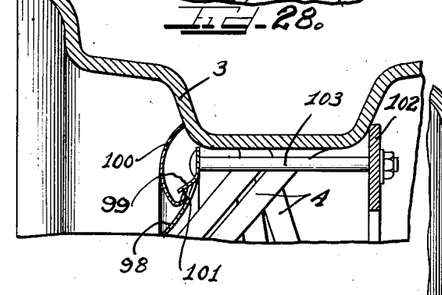
Figure 28 is a fragmentary vertical sectional view of a wheel equipped with a cover plate, illustrating a bolted form of connection for attaching the cover plate to the wheel adjacent the rim of the wheel.

In Figure 28, a bolted construction is shown including a cover plate 98 having a plurality of forwardly extending teeth 99 struck from the peripheral portion of the plate. A decorative band 100 having an outer edge thereof in engagement with the surface of the tire rim and including an underturned portion 101 is held in position over the peripheral portion of the plate by means of the engagement of the portion 101 with the teeth 99. On the opposite side of the lowermost substantially horizontal portion of the tire rim 3 an annular plate member 102 is disposed, and bolts 103 of any desired number interconnect the peripheral portion of the plate 98 and the band plate 102.

These bolts pass between the spokes 4 of the wheel and when tightened cause an engagement of the band plate 102 and the outer peripheral edge of the bead 100 with opposite faces of the tire rim to hold the construction in position.

Figure 29:
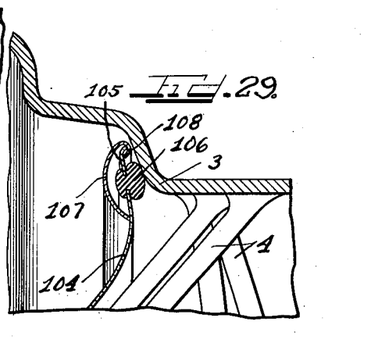
Figure 29 is another fragmentary vertical sectional view of a wheel equipped with a cover plate, illustrating still another form of cushioning construction associated with the cover plate for engagement with the wheel rim.

In Figure 29 a still different form of cushioning construction is illustrated including a cover plate 104 having a peripheral portion 105 provided with spaced apertures therein. In each of these apertures is seated a cushioning plug 106 preferably of soft rubber. The plug is provided with a narrow neck seated in the aperture opening and is expanded on either side thereof to effectively retain its position. As many of these plugs as may be desired are provided. If so desired, a continuous strip of rubber may be inserted in lieu of plugs, such a strip being either annular or in relatively long sections.

Over the peripheral portion of the plate 104, a decorative bead 107 is disposed having an underturned flanged portion 108 engaged around the peripheral edge of the plate 104. Preferably, the bead does not contact with the tire rim, the sole contact being by means of the rubber plugs 106.

From the foregoing, it will be apparent that I have provided cover plate constructions for association with vehicle wheels capable of being readily pressed upon a wheel and, in most instances, being impossible of removal without the use of a very special tool or injury to said part. It will be noted that the device compensates for a considerable variance in displacement between the hub and rim of the wheel, is readily applicable in position upon the wheel, regardless of the disposition of the spokes of the wheel, and also is automatically self-adjustible to compensate for flexing of the rim relatively to the hub of the wheel. It will be further noted that the present invention is simple in construction, highly durable, is not subject to a drumming and rattling action when in use upon a wheel, and may be economically manufactured.

I claim as my invention:

1. With a vehicle wheel of the type having rim and body parts, the body part including a hub having an outer end portion of gradually increasing diameter as it approaches the forward edge of said hub, an ornamental member for disposition over the outer face of said wheel extending generally radially outwardly and axially inwardly from said outer end portion, and a plurality of forwardly and radially inwardly inclined teeth secured to said member at points spaced radially outwardly from said outer end portion of said hub for making a biting engagement with said end portion of said hub.

2. With a vehicle wheel of the type having rim and body parts, the body part including a hub having an outer end portion of gradually increasing diameter as it approaches the forward edge of said hub, an ornamental member for disposition over the outer face of said wheel extending generally radially outwardly and axially inwardly from said outer end portion, a plurality of forwardly and radially inwardly inclined teeth secured to said member at points spaced radially outwardly from said outer end portion of said hub for making a biting engagement with said end portion of said hub, and a plurality of additional teeth at the outer edge of said member for making a biting engagement with said rim.

3. With a vehicle wheel of the type having rim and body parts, the body part including a hub having an outer end portion of gradually increasing diameter as it approaches the forward edge of said hub, an ornamental member for disposition over the outer face of said wheel extending generally radially outwardly and axially inwardly from said outer end portion, and an annulus secured to said member at a point spaced radially outwardly from said outer end portion of said hub, said annulus having forwardly inclined radially inwardly extending teeth for making a biting engagement with said end portion of said hub.

GEORGE ALBERT LYON.